United States Patent
Sudo

(10) Patent No.: US 6,625,111 B1
(45) Date of Patent: Sep. 23, 2003

(54) OFDM COMMUNICATION APPARATUS

(75) Inventor: Hiroaki Sudo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/520,015

(22) Filed: Mar. 6, 2000

(30) Foreign Application Priority Data

Mar. 16, 1999 (JP) .......................................... 11-070899

(51) Int. Cl.$^7$ ................................................ H04J 11/00
(52) U.S. Cl. ........................ 370/203; 708/400; 370/206; 370/207; 370/208; 370/211
(58) Field of Search ................................ 370/203, 206, 370/208, 491, 500, 241; 375/219, 235, 260, 261, 295, 297, 298; 381/19; 455/108, 110, 116, 126; 708/400

(56) References Cited

U.S. PATENT DOCUMENTS

| | | | | |
|---|---|---|---|---|
| 5,596,582 A | * | 1/1997 | Sato et al. ................... | 370/509 |
| 5,602,835 A | * | 2/1997 | Seki et al. ................... | 370/206 |
| 6,035,003 A | * | 3/2000 | Park et al. ................... | 375/326 |
| 6,181,714 B1 | * | 1/2001 | Isaksson et al. ............. | 370/491 |
| 6,359,938 B1 | * | 3/2002 | Keevill et al. .............. | 375/316 |
| 6,366,554 B1 | * | 4/2002 | Isaksson et al. ............. | 370/206 |
| 6,449,245 B1 | * | 9/2002 | Ikeda et al. .................. | 370/208 |
| 6,493,395 B1 | * | 12/2002 | Isaksson et al. ............. | 375/261 |

FOREIGN PATENT DOCUMENTS

| | | |
|---|---|---|
| JP | 06204959 | 7/1994 |
| JP | 8251135 | 9/1996 |
| WO | 9704572 | 2/1997 |

OTHER PUBLICATIONS

Korean Office Action dated Oct. 22, 2002.
English translation of Korean Office Action.

* cited by examiner

*Primary Examiner*—Wellington Chin
*Assistant Examiner*—Jamal A. Fox

(57) ABSTRACT

The known signal that is transmission data for the pilot carrier is output to multiplier 103 to be subjected to amplitude adjustment (gain control) using a predetermined coefficient. The coefficient is set as appropriate in the range that makes an amplitude of the known signal larger than the amplitude of a message signal in consideration of, for example, error rate deterioration and increment of peak power in the entire transmission power. In addition, since the number of pilot carriers is small as compared to the number of all carriers, the increment of the gain of the pilot carrier does not generally have a large effect on the increment of the peak power.

9 Claims, 8 Drawing Sheets

OFDM COMMUNICATION APPARATUS

BACKGROUND OF THE INVENTION

1. Field of the Invention

The present invention relates to an OFDM communication apparatus, and more particularly, to an OFDM communication apparatus in a mobile communication system.

2. Description of the Related Art

The main factor causing deterioration of transmission characteristics of ground wave in transmission path is currently multipath interference. An OFDM (Orthogonal Frequency Division Multiplexing) transmission system resistant to the multipath interference has been recently paid attention. The OFDM system multiplexes a plurality of (a few tens to hundreds) digital modulated signals orthogonalized to each other in a signal interval.

A conventional OFDM communication apparatus is explained using FIGS. 1 to 3. FIG. 1 is a partial block diagram illustrating a schematic configuration of the conventional OFDM communication apparatus, FIG. 2 is a schema illustrating a schematic structure of an OFDM transmission/reception signal, and FIG. 3 is a signal space diagram for a multivalue modulated signal.

In the conventional OFDM communication apparatus, a message is quadrature-modulated in modulation section 1, and IFFT (Inverse Fast Fourier Transform) calculated in IFFT section 2 to be an OFDM signal. Meanwhile, a known signal is IFFT calculated in IFFT section 2 to be an OFDM signal. These OFDM signals are D/A converted in D/A conversion section 3 to be a baseband signal. The baseband signal is amplified, and then transmitted through an antenna as a transmission signal.

The received signal received through an antenna is converted into a digital signal in A/D converter 7, FFT (Fast Fourier Transform) calculated in FFT section 6, and subjected to coherent detection in coherent detection section 5 using the pilot symbol assigned for a head of a signal for symbol synchronization acquisition. The coherent detected signal is output to phase compensation section 4, and subjected to phase compensation based on a phase of the pilot symbol.

The received signal contains, as illustrated in FIG. 2, pilot carriers containing the known signal to perform the phase compensation for the received signal other than the pilot symbol. Herein, it is assumed that, as illustrated in FIG. 2, 4 carriers are contained in the received signal. Further, it is assumed that, as illustrated in FIG. 3, the known signal contained in the pilot carrier is transmitted with 2 bits, and that user data is transmitted with 16 QAM (Quadrature Amplitude Modulation) (4 bits).

With respect to the known signal transmitted with the pilot carrier contained in the received signal, a phase difference is detected for each carrier, and the average of phase differences of all the pilot carriers is calculated. This average of phase differences is a phase rotation amount (residual frequency offset correction amount) for the received signal. The rest of the received signal after the pilot carriers are separated, i.e., user data, is subjected to phase compensation in phase compensation section 4 corresponding to the obtained phase rotation amount. Thus, based on the pilot carrier inserted to the transmission signal, the phase rotation amount of the received signal is calculated to detect a phase error.

Usually, thermal noise is superimposed on the received signal. In this case, the thermal noise is superimposed on the pilot carrier and other subcarriers equally. Accordingly, when the phase compensation is performed on the user data based on the known signal transmitted with the pilot carrier, the user data is expected to contain the thermal noise superimposed on the pilot carrier in addition to the thermal noise superimposed on the subcarriers. Therefore, in the communication environment, when the level of the thermal noise is high, in other words, the carrier to noise ratio (C/N ratio) is low, the accuracy of the phase error detection using the known signal deteriorates, resulting in the problem that accurate phase compensation cannot be performed on the user data.

SUMMARY OF THE INVENTION

An object of the present invention is to provide an OFDM communication apparatus capable of accurately performing phase compensation on user data even when the carrier to noise ratio (C/N ratio) is low.

The subject matter of the present invention is to perform amplitude adjustment (gain control) of a known signal of a pilot carrier, or assign a signal with a large amplitude in multivalue quadrature amplitude modulation for the pilot carrier, to increase a C/N ratio of the known signal, so that the phase compensation can be performed accurately on the user data even when the C/N ratio is low in the communication environment.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be described below with reference to attached drawings.

(First embodiment)

Figure 5:
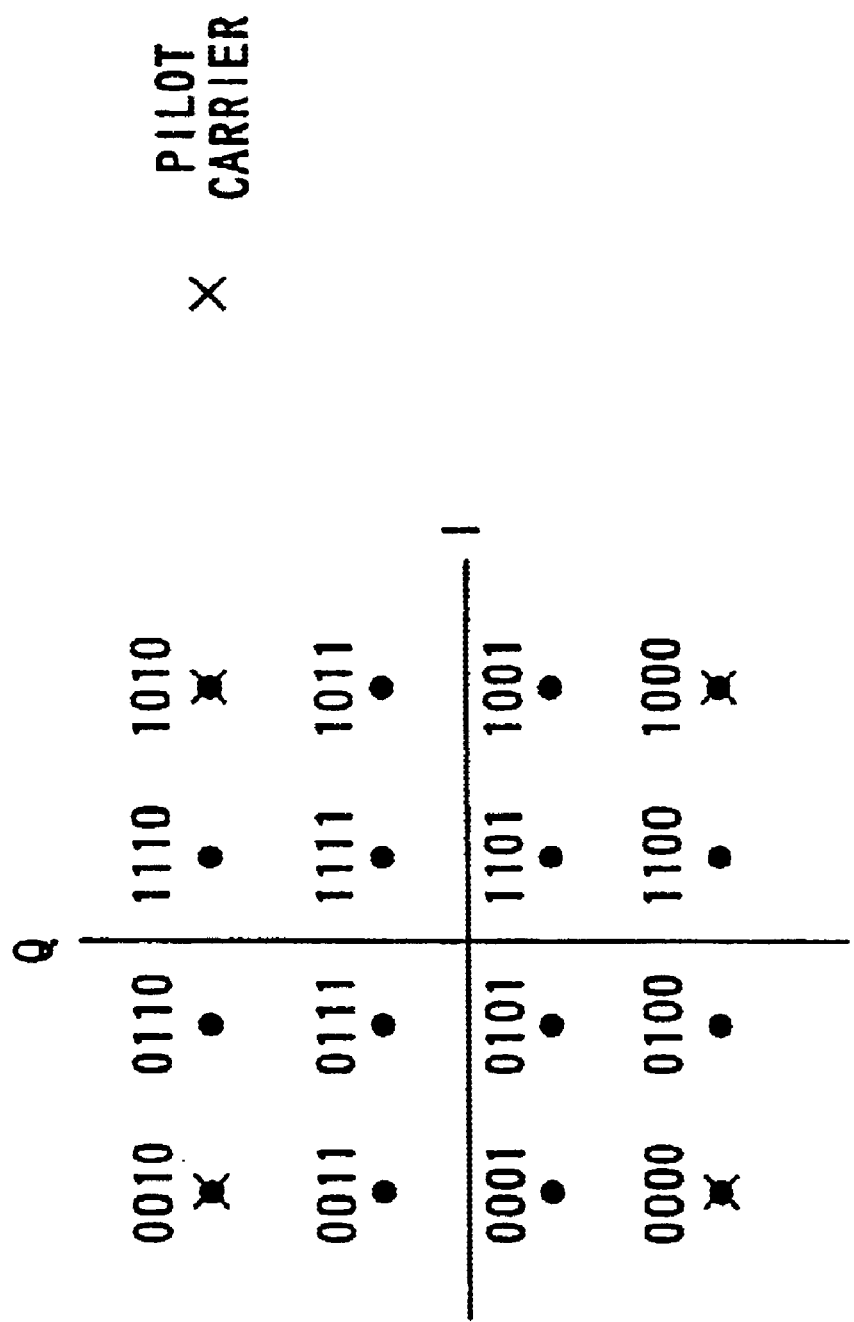
FIG. 5 is diagram illustrating a signal space diagram representing a transmission signal in an OFDM communication apparatus according to a second embodiment.

FIG. 5 is a block diagram illustrating an OFDM communication apparatus according to the first embodiment of the present invention.

First, transmission data (message) for each subcarrier is subjected to digital modulation processing such as QPSK (Quadrature Phase Shift Keying) or QAM (Quadrature Amplitude Modulation) in modulation section 101, and then IFFT calculated in IFFT section 102 to be an OFDM signal.

A known signal of a pilot carrier is output to multiplier 103 to be subjected to amplitude adjustment using a predetermined coefficient. The known signal is IFFT calculated in IFFT section 102 to be an OFDM signal in the same way as described above.

These OFDM signals are D/A converted in D/A conversion section 104 to be a baseband signal. The baseband signal is passed through a low pass filter (not shown in the figure) which removes an unnecessary component from the signal, and then amplified in an amplifier to be transmitted through an antenna as a transmission signal.

Meanwhile, a signal received through an antenna is subjected to gain control in an auto gain control section to be baseband signal. The baseband signal is subjected to quadrature detection processing, then passed through a low pass filter which removes an unnecessary frequency component from the signal, and A/D converted in A/D conversion section 108. In addition, the received signal is separated to an in-phase component and quadrature component by the quadrature detection processing, however, a single signal route is shown in the figure.

The baseband signal is FFT calculated in FFT calculation section 107 to obtain a signal assigned for each subcarrier. The signal is output to coherent detection section 106 to be subjected to coherent detection using a pilot symbol. The coherent detected signal is output to phase compensation section 105, and subjected to phase compensation therein to be received data (message).

The operation of the OFDM communication apparatus with the configuration as described above is next explained.

The known signal that is transmission data for the pilot carrier is output to multiplier 103 to be subjected to the amplitude adjustment (gain control) using a predetermined coefficient. In other words, multiplier 103 multiplies the known signal by the predetermined coefficient to perform the amplitude adjustment. The coefficient is set as appropriate in the range that makes an amplitude of the known signal larger than the amplitude of a message signal in consideration of, for example, error rate deterioration and increment of peak power in the entire transmission power. In addition, since the number of pilot carriers is small as compared to the number of all carries, the increment of the gain of the pilot carrier does not generally have a large effect on the increment of the peak power.

The thus amplitude adjusted known signal is IFFT calculated along with the quadrature modulated message signal to be an OFDM signal. The OFDM signal is D/A converted to be a baseband signal, and then amplified to be transmitted through an antenna as a transmission signal.

The received signal received through an antenna is converted into a digital signal, and then FFT calculated. The calculated signal is subjected to coherent detection using the pilot symbol assigned for a head of the signal for symbol synchronization acquisition. The coherent detected signal is output to phase compensation section 105.

Phase compensation section 105 subjects the coherent detected signal to two-stage phase compensation of phase compensation using the pilot symbol as a reference and phase compensation using the known signal of the pilot carrier.

In other words, with resect to the coherent detected signal, phase variation due to fading is removed by the phase compensation using the pilot symbol as a reference. Next, with respect to the signal from which the phase variation due to fading is removed, the phase variation due to residual frequency offset is removed by the phase compensation using the known signal of the pilot carrier as a reference.

At this point, with respect to the known signal of the pilot carrier contained in the received signal, a phase difference is detected for each sub carrier, and the average of phase differences of all the pilot carriers is calculated. This average of phase differences is a phase rotation amount (residual frequency offset correction amount) for the received signal.

The rest of the received signal after the pilot carriers are separated, i.e., user data, is subjected to phase compensation corresponding to the obtained phase rotation amount. The thus phase compensated signal is fetched as a received message.

Since the transmission side increases the amplitude of the known signal, it is possible to obtain a high C/N ratio for the known signal. Accordingly, in the communication environment, even when the level of thermal noise is high, in other words, the C/N ratio is low, it is possible for the reception side to receive the known signal of the pilot carrier with a level high enough to detect a phase error, and consequently to maintain the accuracy of phase error detection. Thereby, it is possible to perform the phase error detection with high accuracy using the known signal, and to perform accurate phase compensation on the user data.

(Second embodiment)

This embodiment describes the case that a message signal is transmitted with a multivalue quadrature amplitude modulation system. When the message signal is transmitted with the multivalue quadrature amplitude modulation system, herein with the 16 QAM system, the signal point arrangement in a reception side is as illustrated in FIG. 5.

In the signal space diagram illustrated in FIG. 5, since a distance from the origin to a signal point represents an amplitude, the amplitude becomes larger as the distance from the origin becomes longer. Namely, in FIG. 6, signal points (0010), (1010), (1000) and (0000) have a large amplitude.

The transmission side performs the carrier assignment so that the signals respectively corresponding to the above-mentioned signal points become known signals of pilot carriers. The amplitude for these four signal points is larger than that for the other signal points as described above. Accordingly, signals corresponding to these signal points are considered to be equivalent to the resultant signal obtained in the first embodiment by multiplying the known signal by the predetermined coefficient. In other words, these signal points are considered to be obtained by performing the amplitude adjustment on the other signal points.

The signal thus having a large amplitude transmitted with the pilot carrier is converted into a digital signal at the reception side, and then FFT calculated. The calculated signal is subjected to coherent detection using a pilot symbol assigned for a head of the signal for symbol synchronization acquisition. The coherent detected signal is output to phase compensation section 105.

Phase compensation section 105 subjects, in the same way as in the embodiment 1, the coherent detected signal to the two-stage phase compensation of the phase compensation using the pilot symbol as a reference and the phase compensation using the known signal of the pilot carrier.

Since the transmission side uses a signal with a large amplitude obtained in the multivalue quadrature modulation system as the known signal, it is possible to obtain a high C/N ratio for the known signal. This case makes specific amplitude adjustment (gain control) no need, thereby enabling the simplification of the apparatus.

According to such a configuration, in the communication environment, even when the level of thermal noise is high, in other words, the C/N ratio is low, it is possible for the reception side to receive the known signal of the pilot carrier with a level high enough to detect a phase error, and consequently to maintain the accuracy of phase error detection. Thereby, it is possible to perform the phase error detection with high accuracy using the known signal, and to perform accurate phase compensation on the user data.

(Third embodiment)

This embodiment describes the case that a coefficient used in the amplitude adjustment is set at a value achievable by using a bit shifter and processing the addition and subtraction without using a multiplier so as to reduce the hardware scale.

Figure 1:
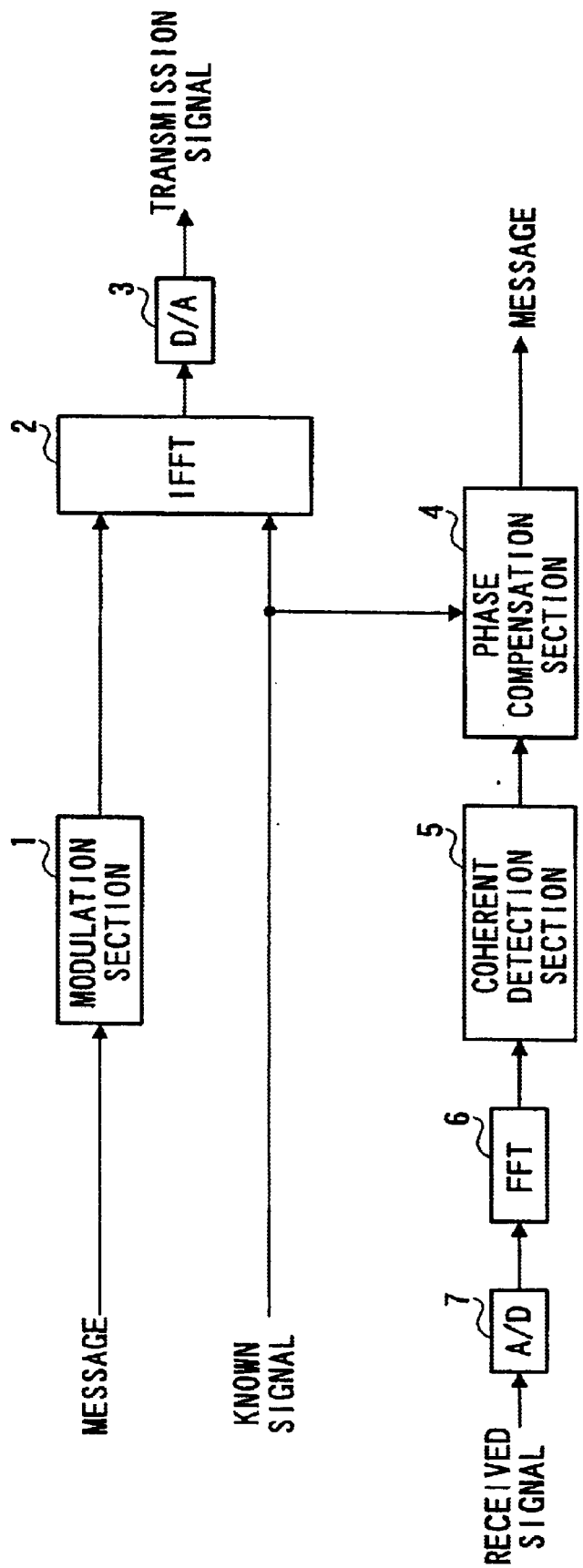
FIG. 1 is a block diagram illustrating a conventional OFDM communication apparatus.
Figure 2:
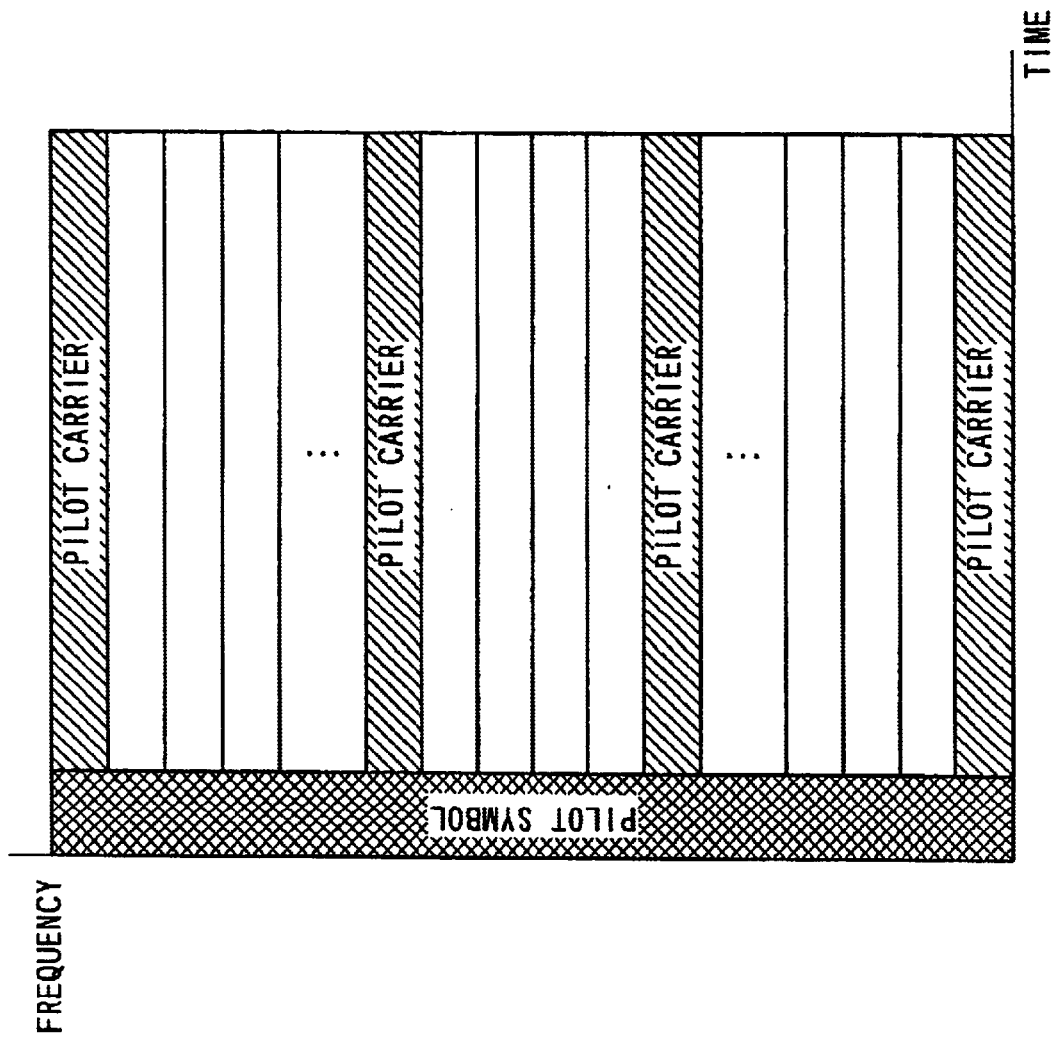
FIG. 2 is a schema illustrating a schematic structure of an OFDM transmission/reception signal.
Figure 3:
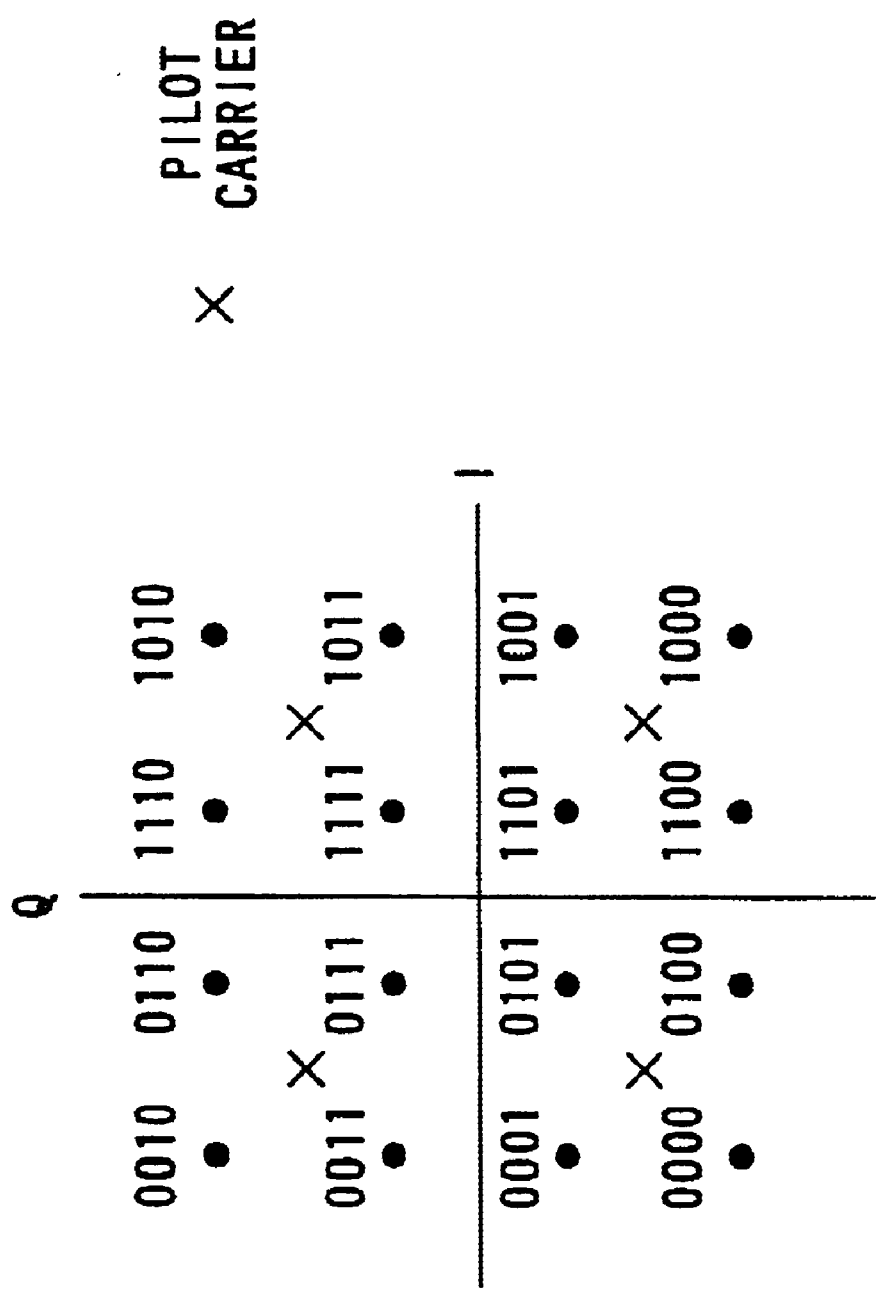
FIG. 3 is a diagram illustrating a signal space diagram representing a transmission signal in the conventional OFDM communication apparatus.
Figure 4:
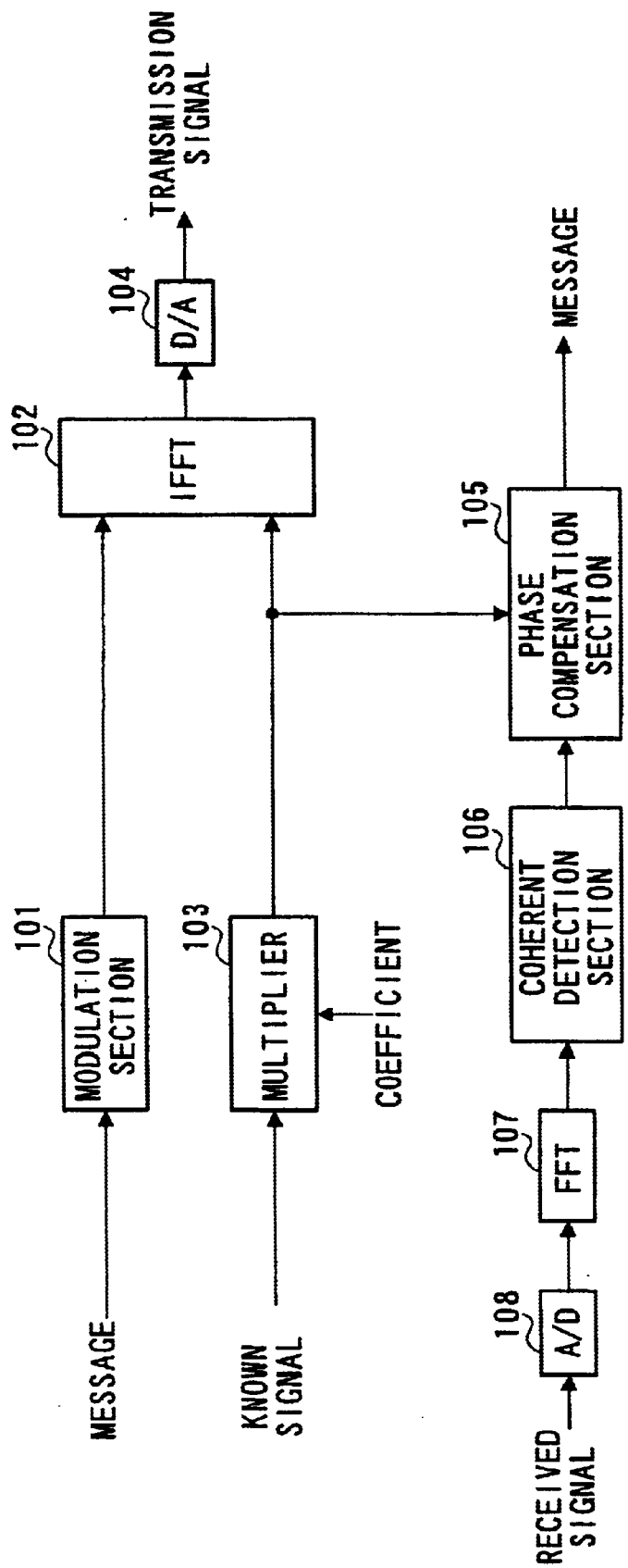
FIG. 4 is a block diagram illustrating an OFDM communication apparatus according to a first embodiment of the present invention.
Figure 6:
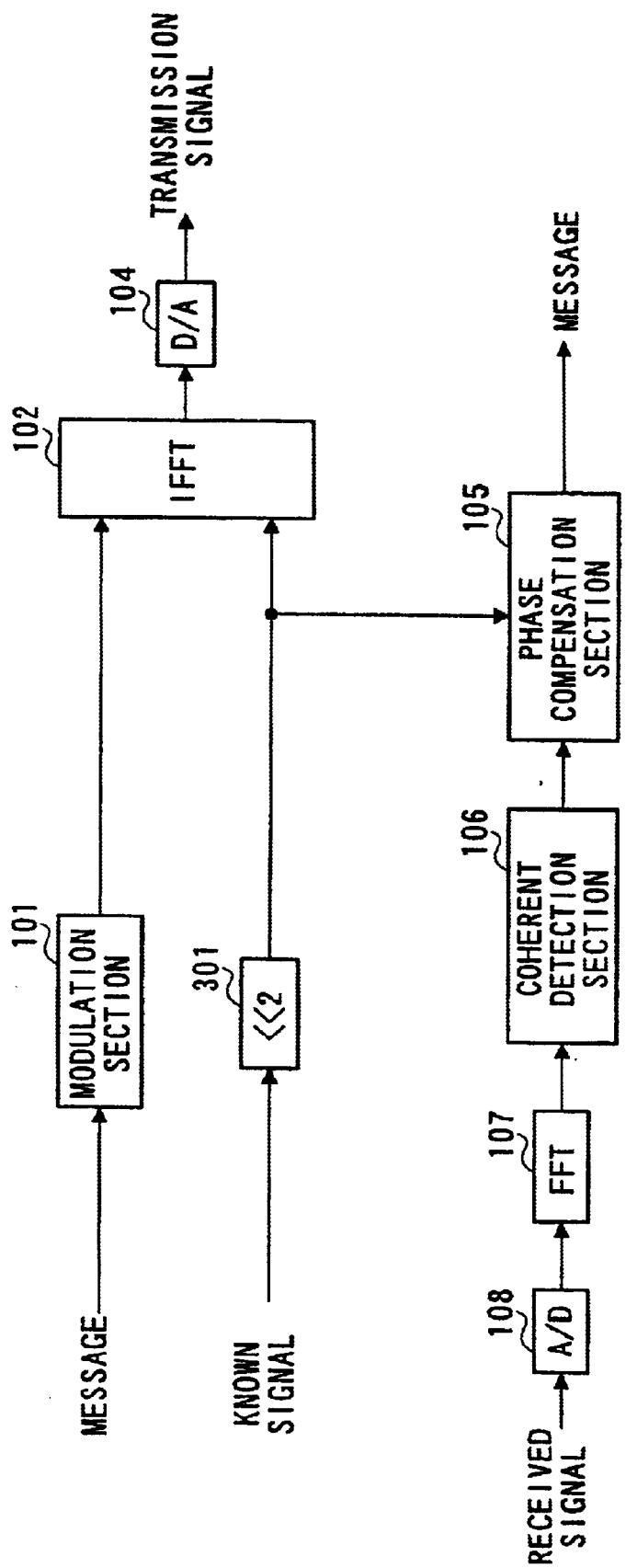
FIG. 6 is a block diagram illustrating an OFDM communication apparatus according to a third embodiment of the present invention.

FIG. 6 is a block diagram illustrating an OFDM communication apparatus according to the third embodiment of the present invention. In FIG. 6, the same section as in FIG. 4 is given the same mark as in FIG. 4 to omit the explanation thereof.

The OFDM communication apparatus illustrated in FIG. 6 is provided with bit shifter 301 instead of multiplier 103. The amplitude adjustment (gain control) is performed by this bit shifter 301.

The operation of the OFDM communication apparatus with the configuration as described above is next explained.

The known signal that is data for the pilot carrier is output to bit shifter 301 to be subjected to the amplitude adjustment (gain control) using a predetermined coefficient. In other words, the amplitude adjustment is performed on the known signal by performing bit shift and addition in bit shifter 301.

In digital signal processing, since an amplitude of a signal becomes half (0.5 times) the original amplitude by one-bit-shift, two-bit-shift makes 0.25 times the original amplitude. Bit shifter 301 adds an output signal of one-bit-shift and an output signal of two-bit-shift to obtain an output signal with 0.75 times the original amplitude, further adds the output signal with 0.75 times the original amplitude and the known signal with the original amplitude, and thereby obtains an output signal with 1.75 times the original amplitude. In addition, the magnification ratio can be determined as appropriate by a bit shifter and addition and subtraction processing. Thus, since the configuration of this embodiment does not need a multiplier, it is possible to decrease the calculation amount, and consequently to reduce the hardware scale.

The thus amplitude adjusted known signal is IFFT calculated along with the quadrature modulated message signal to be an OFDM signal. The OFDM signal is D/A converted to be a baseband signal, and then amplified to be transmitted through an antenna as a transmission signal.

The received signal received through an antenna is converted into a digital signal, and then FFT calculated. The calculated signal is subjected to coherent detection using a pilot symbol assigned for a head of the signal for symbol synchronization acquisition. The coherent detected signal is output to phase compensation section 105.

Phase compensation section 105 subjects, in the same way as in the first embodiment, the coherent detected signal to the two-stage phase compensation of the phase compensation using the pilot symbol as a reference and the phase compensation using the known signal of the pilot carrier.

Since the transmission side increases the amplitude of the known signal, it is possible to obtain a high C/N ratio for the known signal. Accordingly, in the communication environment, even when the level of thermal noise is high, in other words, the C/N ratio is low, it is possible for the reception side to receive the known signal of the pilot carrier with a level high enough to detect a phase error, and consequently to maintain the accuracy of phase error detection. Thereby, it is possible to perform the phase error detection with high accuracy using the known signal, and to perform accurate phase compensation on the user data.

(Fourth embodiment)

This embodiment describes the case that a coefficient used in the amplitude adjustment is switched corresponding to a channel quality, so that phase error detection characteristics are improved and concurrently the increase of peak power is prevented.

Figure 7:
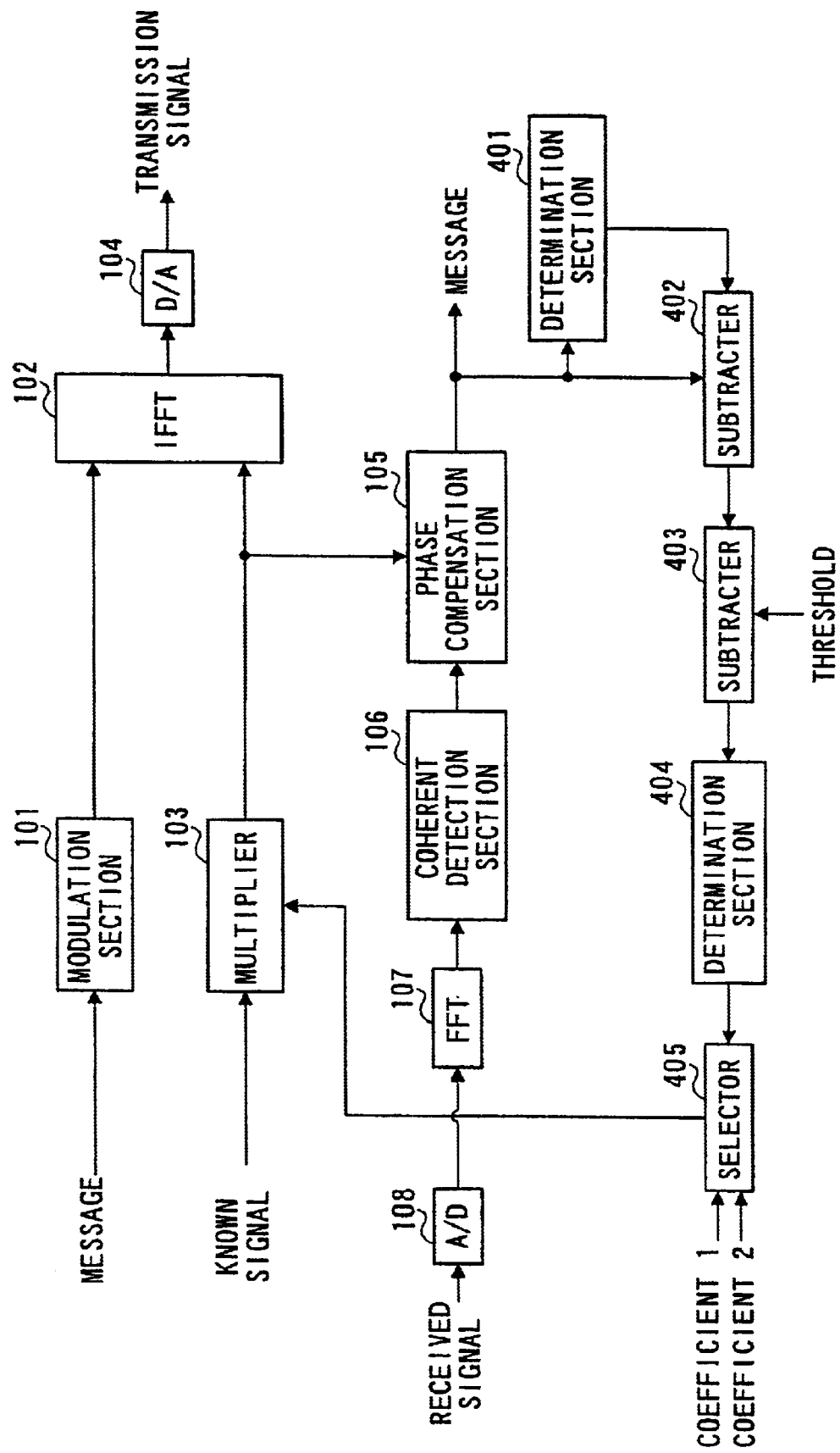
FIG. 7 is a block diagram illustrating an OFDM communication apparatus according to a fourth embodiment of the present invention.

FIG. 7 is a block diagram illustrating an OFDM communication apparatus according to the fourth embodiment of the present invention. In FIG. 7, the same section as in FIG. 4 is given the same mark as in FIG. 4 to omit the explanation thereof.

The OFDM communication apparatus illustrated in FIG. 7 performs channel estimation on an output from phase compensation section 105, and makes a determination using a threshold on the estimated channel value to switch the coefficient used in amplitude adjustment. Namely, the OFDM communication apparatus illustrated in FIG. 7 has determination section 401 that makes a quadrant determination on a phase compensated signal, subtracter 402 that obtains a difference between the determined result and the received signal, subtracter 403 that obtains a difference between the subtracted result and the predetermined threshold, determination section 404 that makes a determination on the subtracted result, and selector 405 that selects a coefficient for use in the amplitude adjustment based on the determined result.

The operation of the OFDM communication apparatus with the configuration as described above is next explained.

The known signal that is transmission data for the pilot carrier is output to multiplier 103 to be subjected to the amplitude adjustment (gain control) using a predetermined coefficient. In other words, multiplier 103 multiplies the known signal by the predetermined coefficient to perform the amplitude adjustment.

The thus amplitude adjusted known signal is IFFT calculated along with the quadrature modulated message signal to be an OFDM signal. The OFDM signal is D/A converted to be a baseband signal, and then amplified to be transmitted through an antenna as a transmission signal.

The received signal received through an antenna is converted into a digital signal, and then FFT calculated. The calculated signal is subjected to coherent detection using a pilot symbol assigned for a head of the signal for symbol synchronization acquisition. The coherent detected signal is output to phase compensation section 105.

Phase compensation section 105 subjects, in the same way as in the first embodiment, the coherent detected signal to the two-stage phase compensation of the phase compensation using the pilot symbol as a reference and the phase compensation using the known signal of the pilot carrier.

The phase compensated signal is subjected to the quadrant determination in determination section 401. The quadrant determined signal is output to subtracter 402 to be subjected to subtraction processing with the phase compensated signal, and the subtracted result is output to subtracter 403. Subtracter 403 performs subtraction processing on the subtracted result from subtracter 402 with the threshold. The threshold is set as appropriate corresponding to the channel quality.

The subtracted result in subtracter 403 is output to determination section 404 to be determined using the threshold, and the determined result is output to selector 405. Corresponding to the determined result obtained by using the threshold, in other words, corresponding to the channel quality, selector 405 selects the coefficient for use in the amplitude adjustment for the known signal. For example, in the case where the channel quality is good, in other words, the subtracted result from subtracter 402 does not exceed the threshold, selector 405 selects coefficient 1 that is relatively small to suppress the increase of peak power. On the other hand, in the case where the channel quality is poor, in other words, the subtracted result from subtracter 402 exceeds the threshold, selector 405 selects coefficient 2 that is relatively large to provide the known signal with large amplitude adjustment, thereby improving the phase error detection characteristics. It is thus possible to improve the phase error detection characteristics, and concurrently to prevent the increase of peak power.

Thus, since the transmission side increases the amplitude of the known signal, it is possible to obtain a high C/N ratio for the known signal. Accordingly, in the communication environment, even when the level of thermal noise is high, in other words, the C/N ratio is low, it is possible for the reception side to receive the known signal of the pilot carrier with a level high enough to detect a phase error, and consequently to maintain the accuracy of phase error detection. Thereby, it is possible to perform the phase error detection with high accuracy using the known signal, and to perform accurate phase compensation on the user data.

(Fifth embodiment)

This embodiment describes the case that the reliability of the channel quality estimation is improved, so that the accuracy of the amplitude adjustment of the known signal is improved.

Figure 8:
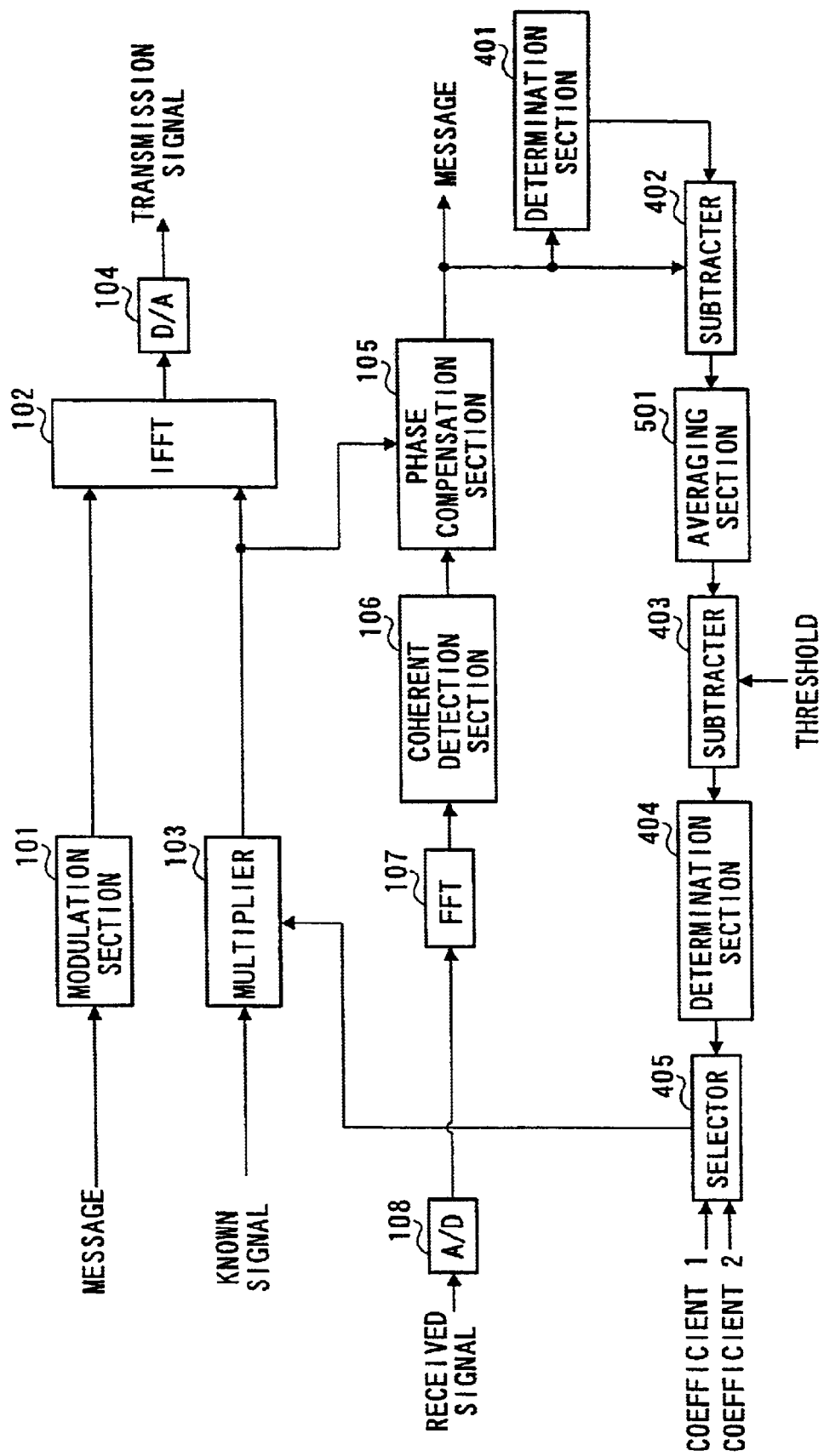
FIG. 8 is a block diagram illustrating an OFDM communication apparatus according to a fifth embodiment of the present invention.

FIG. 8 is a block diagram illustrating an OFDM communication apparatus according to the fifth embodiment of the present invention. In FIG. 8, the same section as in FIG. 7 is given the same mark as in FIG. 7 to omit the explanation thereof.

The OFDM communication apparatus illustrated in FIG. 8 has averaging section 501 that averages results from subtracter 402 over a plurality of symbols or a plurality of slots.

The operation of the OFDM communication apparatus with the configuration as described above is next explained.

The known signal that is transmission data for the pilot carrier is output to multiplier 103 to be subjected to the amplitude adjustment (gain control) using a predetermined coefficient. In other words, multiplier 103 multiplies the known signal by the predetermined coefficient to perform the amplitude adjustment.

The thus amplitude adjusted known signal is IFFT calculated along with the quadrature modulated message signal to be an OFDM signal. The OFDM signal is D/A converted to be a baseband signal, and then amplified to be transmitted through an antenna as a transmission signal.

The received signal received through an antenna is converted into a digital signal, and then FFT calculated. The calculated signal is subjected to coherent detection using a pilot symbol assigned for a head of the signal for symbol synchronization acquisition. The coherent detected signal is output to phase compensation section 105.

Phase compensation section 105 subjects, in the same way as in the first embodiment, the coherent detected signal to the two-stage phase compensation of the phase compensation using the pilot symbol as a reference and the phase compensation using the known signal of the pilot carrier.

The phase compensated signal is subjected to the quadrant determination in determination section 401. The quadrant determined signal is subjected in subtracter 402 to subtraction processing with the phase compensated signal, and the subtracted result is output to averaging section 501. Average section 501 stores the subtracted results of a plurality of symbols or a plurality of slots to calculate the average, and outputs the average to subtracter 403. Subtracter 403 performs subtraction processing on the average from averaging section 501 with a threshold. The threshold is set as appropriate corresponding to the channel quality.

The average in averaging section 501 is output to determination section 404 to be determined using the threshold, and the determined result is output to selector 405. Corresponding to the determined result obtained by using the threshold, in other words, corresponding to the channel quality, selector 405 controls the amplitude adjustment for the known signal. For example, corresponding to the channel quality, selector 405 selects the coefficient for use in the amplitude adjustment to switch.

Specifically, in the case where the channel quality is good, in other words, the average does not exceed the threshold, selector 405 selects coefficient 1 that is relatively small to suppress the increase of peak power. On the other hand, in the case where the channel quality is poor, in other words, the average exceeds the threshold, selector 405 selects coefficient 2 that is relatively large to provide the known signal with large amplitude adjustment, thereby improving the phase error detection characteristics. It is thus possible to improve the phase error detection characteristics, and concurrently to prevent the increase of peak power. Further, since the subtracted results of the plurality of symbols or the plurality of slots are stored, while the average of the results is calculated, the reliability of the channel quality estimation is improved, and therefore the gain coefficient can be selected further optimally.

Thus, since the transmission side increases the amplitude of the known signal, it is possible to obtain a high C/N ratio for the known signal. Accordingly, in the communication environment, even when the level of thermal noise is high, in other words, the C/N ratio is low, it is possible for the reception side to receive the known signal of the pilot carrier with a level high enough to detect a phase error, and consequently to maintain the accuracy of phase error detection. Thereby, it is possible to perform the phase error detection with high accuracy using the known signal, and to perform accurate phase compensation on the user data.

The OFDM communication apparatus in any of the above-mentioned embodiments 1 to 5 is applicable to a base station and communication terminal apparatus such as a mobile station in a digital radio communication system. The application of the present invention thereto enables such an apparatus to perform accurate phase compensation on user data, and further to perform communications highly resistant to multipath interference even when a carrier to noise ratio (C/N ratio) is low.

The present invention is not limited to the above-mentioned first to fifth embodiments, and is capable of being carried into practice with various modifications thereof. Further, the above-mentioned first to fifth embodiments are capable of being carried into practice in a combination thereof as appropriate.

As explained above, the OFDM communication apparatus of the present invention performs the amplitude adjustment (gain control) of the known signal to be transmitted with the pilot carrier, or assigning a signal with a large amplitude in the multivalue quadrature amplitude modulation to a pilot carrier, whereby the apparatus increases the C/N ratio of the known signal, and therefore even when the C/N ratio in the communication environment is low, is capable of performing the phase compensation accurately on user data.

The present invention is not limited to the above described embodiments, and various variations and modifications may be possible without departing from the scope of the present invention.

This application is based on the Japanese Patent Application No.HEI11-070899 filed on Mar. 16, 1999, entire content of which is expressly incorporated by reference herein.

What is claimed is:

1. An OFDM communication apparatus comprising:
   amplitude adjusting means for adjusting an amplitude of a known signal to be transmitted with a pilot carrier so that said amplitude is larger than an amplitude of a signal to be transmitted with an other subcarrier; and
   transmission means for transmitting an OFDM signal containing the known signal with an adjusted amplitude and said signal to be transmitted with the other subcarrier.

2. An OFDM communication apparatus comprising:
   carrier assigning means for assigning a multivalue quadrature amplitude modulated signal with a relatively large amplitude to a pilot carrier; and
   transmission means for transmitting an OFDM signal containing a signal assigned to said pilot carrier and a signal assigned to an other subcarrier.

3. The OFDM communication apparatus according to claim 1, wherein said amplitude adjustment means is comprised of a bit shifter and an adder-subtracter.

4. The OFDM communication apparatus according to claim 1, further comprising:
   channel quality estimation means for estimating a quality of a communication channel; and
   amplitude adjustment control means for controlling amplitude adjustment corresponding to an estimated quality.

5. The OFDM communication apparatus according to claim 4, wherein said channel quality estimation means has averaging means for averaging estimated channel quality values of a plurality of symbols or a plurality of slots.

6. An OFDM communication method comprising:
   the amplitude adjusting step of adjusting an amplitude of a known signal to be transmitted with a pilot carrier so that said amplitude is larger than an amplitude of a signal to be transmitted with an other subcarrier; and
   the transmission step of transmitting an OFDM signal containing the known signal with an adjusted amplitude and said signal to be transmitted with the other subcarrier.

7. An OFDM communication method comprising:
   the carrier assigning step of assigning a multivalue quadrature amplitude modulated signal with a relatively large amplitude to a pilot carrier; and
   the transmission step of transmitting an OFDM signal containing a signal assigned to said pilot carrier and a signal assigned to an other subcarrier.

8. The OFDM communication method according to claim 6, further comprising:
   the channel quality estimation step of estimating a quality of a communication channel; and
   the amplitude adjustment control step of controlling amplitude adjustment corresponding to an estimated quality.

9. The OFDM communication apparatus according to claim 8, wherein said channel quality estimation step has the averaging step of averaging estimated channel quality values of a plurality of symbols or a plurality of slots.

* * * * *